(12) United States Patent
Brandwine et al.

(10) Patent No.: US 9,112,841 B1
(45) Date of Patent: Aug. 18, 2015

(54) APPLIANCE BACKNETS IN DEDICATED RESOURCE ENVIRONMENT

(75) Inventors: Eric Jason Brandwine, Haymarket, VA (US); Marvin M. Theimer, Bellevue, WA (US); Don Johnson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1187 days.

(21) Appl. No.: 12/885,283

(22) Filed: Sep. 17, 2010

(51) Int. Cl.
*H04L 29/06* (2006.01)
*G06F 15/177* (2006.01)

(52) U.S. Cl.
CPC .................. *H04L 63/08* (2013.01); *H04L 63/10* (2013.01)

(58) Field of Classification Search
CPC .......... H04L 63/08; H04L 63/02; H04L 63/10
See application file for complete search history.

(56) References Cited

U.S. PATENT DOCUMENTS

| | | | |
|---|---|---|---|
| 2009/0177789 A1* | 7/2009 | Choudhury | 709/229 |
| 2010/0097943 A1* | 4/2010 | D'Souza et al. | 370/248 |
| 2010/0250748 A1* | 9/2010 | Sivasubramanian et al. | 709/226 |

* cited by examiner

*Primary Examiner* — Suraj Joshi
(74) *Attorney, Agent, or Firm* — Kilpatrick Townsend & Stockton LLP

(57) ABSTRACT

A backnet can be created within a dedicated private network of a customer that enables a distinct party to access and/or control a portion of the resources within the private network. In one example, a backnet includes a separate virtual interface for an appliance or other such resource that is not visible or accessible to the customer owning the customer cloud, but can be accessed by another appliance or component in the customer cloud, or an appliance vendor external to the customer cloud. While the customer can control the permission for the backnet, the vendor can control or implement the resources within the backnet in a way that is isolated from the customer. Usage of the backnet can be separately monitored and billed to the vendor, even though the resources are part of the dedicated customer cloud.

30 Claims, 6 Drawing Sheets

APPLIANCE BACKNETS IN DEDICATED RESOURCE ENVIRONMENT

BACKGROUND

As an increasing number of applications and services are being made available over networks such as the Internet, an increasing number of content, application, and/or service providers are turning to shared-resource technologies such as cloud computing and distributed data centers. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In many instances a customer will want a dedicated network space that is isolated from other users or entities. Such an approach leads to difficulties with providers of various network appliances and appliance services, for example, where the provider requires specific types of communication with an appliance in order for the appliance/service to operate as intended, such as to communicate with the vendor outside the dedicated space and/or other instances of an appliance within the dedicated space. A customer owning a dedicated customer network space can potentially alter or restrict certain types of traffic, which can lead to problems with the appliance/service in that space. Further, because the appliance or service is using resources that are dedicated to the customer, the customer will typically be charged for such usage even when the appliance is communicating for reasons that should not be billed to the customer.

BRIEF DESCRIPTION OF THE DRAWINGS

Various embodiments in accordance with the present disclosure will be described with reference to the drawings, in which.

DETAILED DESCRIPTION

Figure 1:
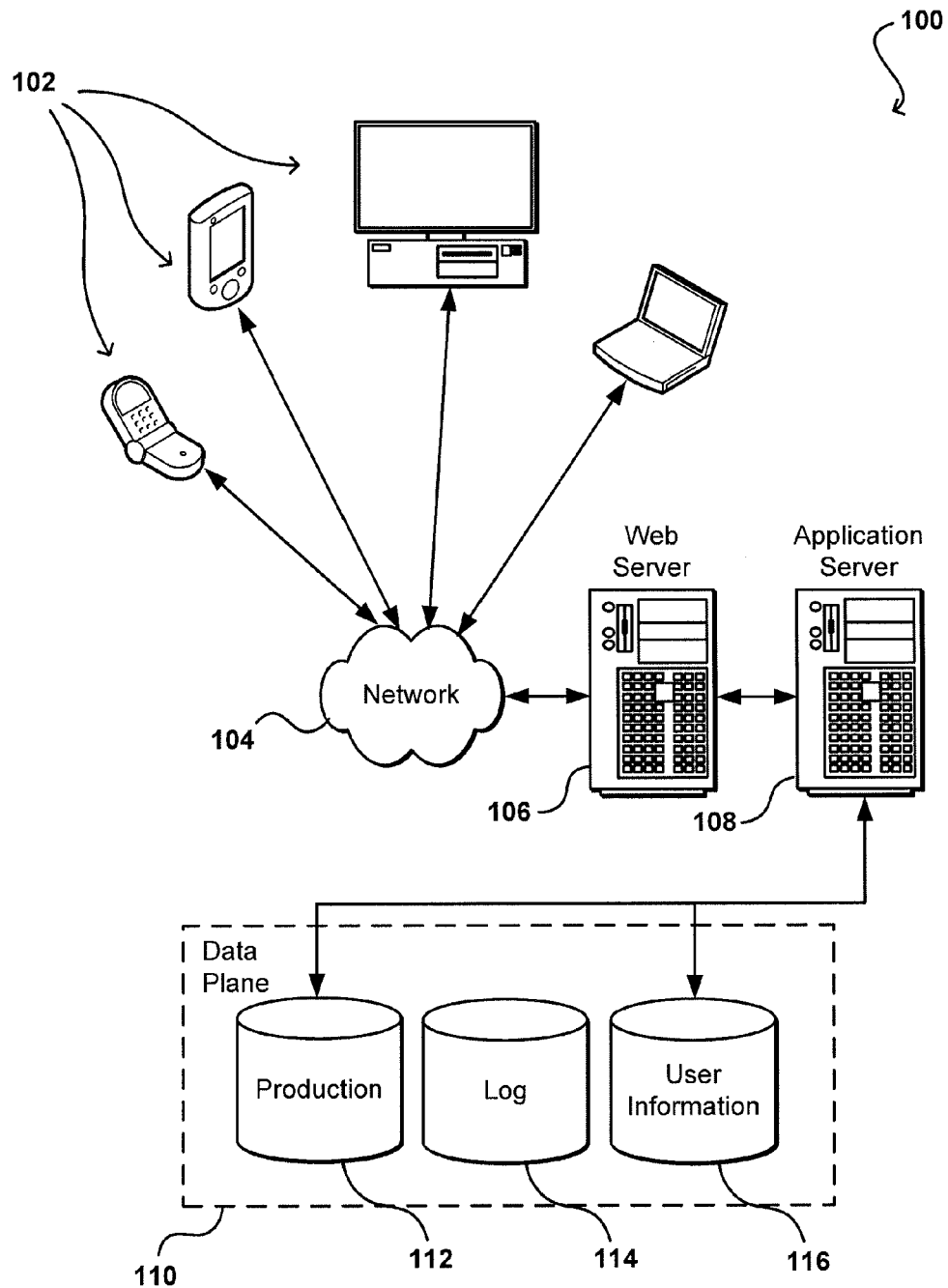
FIG. 1 illustrates an environment in which various embodiments can be implemented.

Systems and methods in accordance with various embodiments of the present disclosure may overcome one or more of the aforementioned and other deficiencies experienced in conventional approaches to managing aspects of data storage and/or resource sharing in an electronic environment. In particular, various embodiments provide appliances and other electronic components within a dedicated customer network space, or virtual customer network, with the ability to separately communicate with a vendor, third party, other components or instances, or other endpoint within, or external to, the dedicated customer space. A number of appliances or other resource instances can be contained within the dedicated customer network, but can be accessed in a manner that is invisible to the customer using a dedicated interface or "backnet" that is authorized by, but not accessible to, the customer. This backnet can be used to provide a dedicated sub-net within the dedicated customer space that can allow for appliance traffic, vendor traffic, or other traffic that should be separated from the user traffic for any appropriate reason.

In various embodiments, customers can obtain dedicated private virtual networks of shared resources, referred to herein as isolated "customer clouds," where any incoming and outgoing traffic with respect to the customer cloud, as well as traffic within the cloud, is explicit, and is determined and/or controlled by the customer. Customers may want to utilize various "appliances" or "appliance services" within the customer cloud. An appliance, as utilized herein, refers to any customer instance or other electronic resource that can be utilized in the customer cloud but is presented to the customer as something else. For example, a load balancing service might utilize a particular server instance within a customer network, but the customer is presented with a "load balancer" appliance. Similarly, a relational database service might utilize a different server instance, but present the customer with one or more "databases." In order to operate at least some of these services as intended, the owners or providers of the respective service must be able to interact with, and manage, these instances, as well as to obtain health and metering information and other such tasks. For other services, instances must be able to communicate with each other within the customer cloud. Other appliances can be used as well with the various embodiments, such as an auto-scaling appliance, a firewall, a network accelerator, a container manager, a configuration detector, or a caching appliance.

While in some cases the provider of the customer cloud can provide these services, there can be other cases where the provider of such appliance services will be an arbitrary third party. If the appliance communication utilizes standard customer-facing traffic for the customer cloud, the customer can have the ability disable this traffic as part of the network configuration. The provider of the cloud may desire to be able to guarantee the connectivity required by the appliance service without compromising the control that the customer has, in order to enable third parties to develop and implement these services while providing customers with the isolation and security they desire.

In at least some embodiments, a customer can delegate to a provider and/or appliance service the right to create a private sub-network, or "backnet," within the dedicated customer cloud. This backnet will be "owned" by the appliance service, and can be utilized for traffic within the cloud and/or connected to the outside world using any mechanism similar to those available to the customer-exposed portion of the customer cloud, or the "frontnet." Such an approach enables an appliance service owner or provider to essentially create a private virtual sub-network ("subnet") within the isolated customer cloud.

In some examples, an appliance service provider may want to be able to poll the resources in a customer cloud in order to ensure that the service is working properly, obtain usage or metering information, etc. In other examples, the instances of the appliance might need to communicate information, for purposes such as replication or load balancing. A provider also might want the ability to log into the appliances or instances in order to debug or troubleshoot certain issues, upgrade various software, scale a number of instances, or any of a number of other such tasks. Thus, traffic in the backnet can be initiated by an instance, some outside party such as an appliance service provider, or another entity other than the customer.

As part of a backnet configuration in certain embodiments, an appliance can have two virtual network interfaces (VIFs): a "frontplane" VIF that logically faces the customer network as part of the frontnet, used for customer traffic to the appliance; and a "backplane" VIF that logically faces the backnet, a distinct appliance subnet within the customer network, used for inter-appliance traffic, appliance to vendor traffic, control communication with a dedicated network of the appliance vendor, or other such traffic. A backnet in at least some embodiments is a subnet that the appliance vendor owns, placed inside the customer cloud with express permission. This backnet can be authorized by the customer for any use by an appliance, multiple appliances, a vendor, or multiple vendors, for any purpose or for specific purposes and/or at specific times as many be configured by the customer. A vendor or other third party can control this subnet and will generally pay for the bandwidth used for the subnet. In one example, appliance-to-appliance traffic may involve regional bandwidth, such as may involve crossing between disparate geographical regions and/or between different data zones or data centers. This traffic typically carries a charge (e.g., $0.01/GB), and many appliance owners would like to be able to absorb this charge themselves, rather than passing the cost directly on to the customers.

The use of a backnet in at least some embodiments can provide the ability to distinguish customer traffic from control, inter-appliance, or other vendor or third party traffic. This separation can be beneficial for billing purposes, as the customer can be prevented from being billed for network bandwidth related to control and maintenance traffic, etc. Such an approach also results in an operational decoupling by enabling the appliance vendor to utilize a distinct sub-network under its control for background service and related functions, while still presenting the customer with explicit configuration control over the customer cloud.

Various embodiments utilize a separate control environment, or control plane, that can be used to enable a customer to manage and/or alter various aspects of a data environment, or data plane. This "self-service" functionality can be provided via a set of Web services, enabling the customer and control plane to act together as a virtual database administrator (DBA). A customer can submit a request to the control plane through one of a plurality of externally-visible application programming interfaces (APIs), for example. Various APIs can be used to perform specific functions with respect to a resource, such as a relational database, in the data environment. A request received to one of the APIs can be analyzed to determine the desired action(s) to be performed in the data plane, such as actions that delegate a specific resource or range of addresses to a customer for use in implementing a dedicated backnet. A component such as a workflow component can determine the appropriate tasks for the action, and cause the tasks to be executed in an appropriate order. At least one of these tasks typically will be performed in the data environment, such as to adjust an aspect of an appliance service allocation.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment includes at least one electronic client device 102, which can include any appropriate device operable to send and receive requests, messages, or information over an appropriate network 104 and convey information back to a user of the device. While the term "customer" is used herein for purposes of explanation, it should be understood that any appropriate user of a cloud, space, resource, or service can utilize functionality described within the scope of the various embodiments. Examples of such client devices include personal computers, cell phones, handheld messaging devices, notebook computers, video game systems, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be useful for reporting, analysis, and other such uses. It should be understood that there can be many other aspects that may need to be stored in the data store, such as for page image information and access right information, which can be stored in any of the above listed mechanisms as appropriate or in additional mechanisms in the data store 110. The data store. 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

In one example where resources are shared among multiple users, a relational database service ("RDS") is implemented and made available over a network 206 that enables developers, customers, or other authorized users to easily and cost-effectively obtain and configure relational databases and other such data sources so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
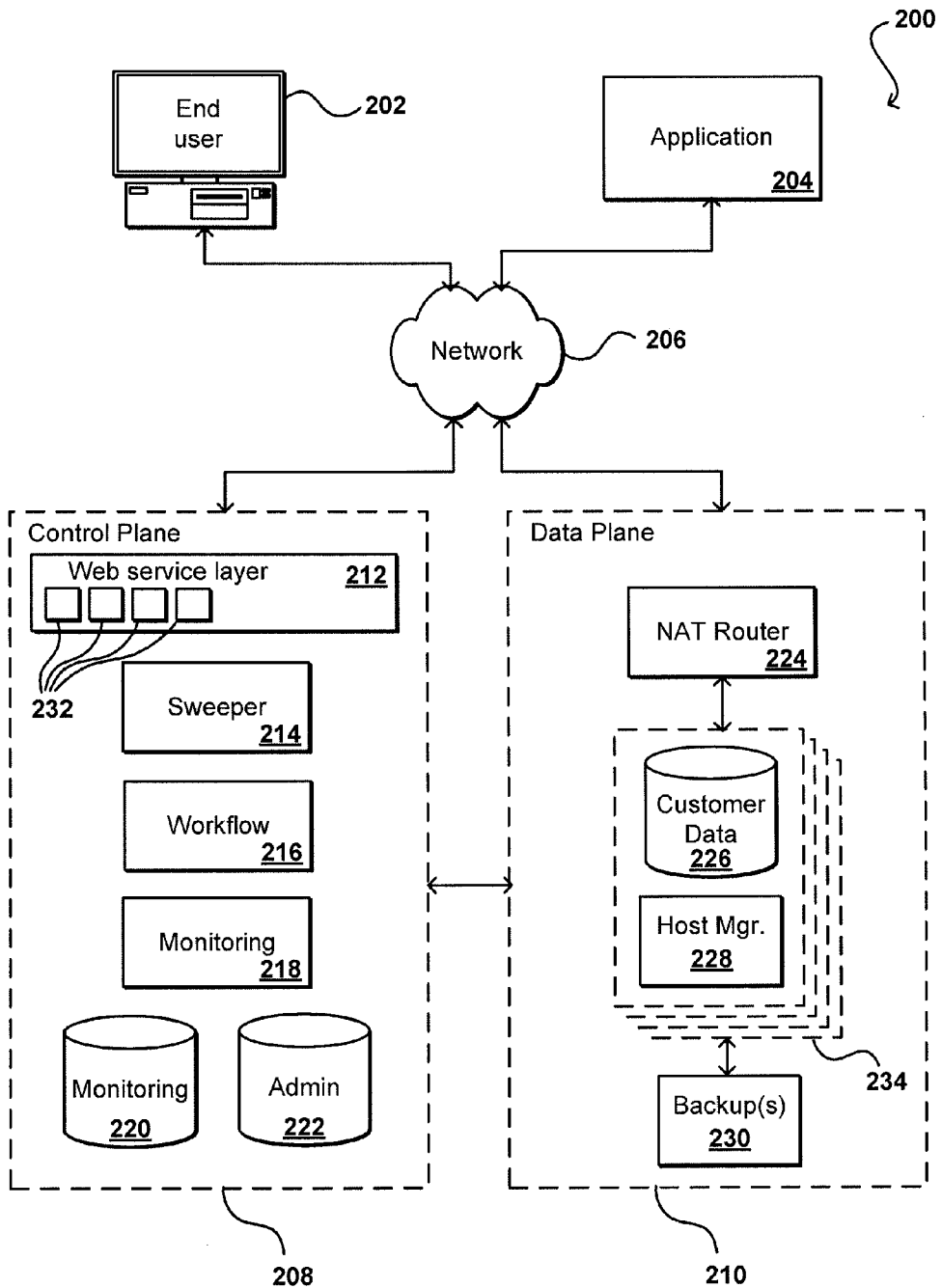
FIG. 2 illustrates an example separation of a control plane and a data plane that can be used in accordance with various embodiments.

FIG. 2 illustrates an example of an RDS implementation 200 that can be used in accordance with various embodiments. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206. Each API can be provided to receive requests for at least one specific action to be performed with respect to the data environment, such as to provision, scale, clone, or hibernate an instance of a relational database. Upon receiving a request to one of the APIs, the Web services layer can parse or otherwise analyze the request to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

Using a control plane or service as described herein, a user or customer can instead submit a call including information such as a type of hardware and a version of a database product. The control plane or service can then perform the necessary tasks to create, delete, modify, expand, or otherwise modify a data store or data storage instance. The control plane also can support several different database engines in a consistent fashion, without requiring a DBA to be an expert in each of the engines. Once provisioned, the user has native access to the data instance(s), and can simply point existing applications (such as MySQL applications) to the DNS address or other location information for the particular instance. There is no restriction or modification of query models or other such functionality, as a user can continue to use applications built on MySQL, Oracle, or other database technology.

As discussed, a control plane can enable customers to provision instances, request usage of specific resources, and perform various other tasks in the data plane. In many instances, these customers will want to ensure that any information transmitted to, retrieved from, stored in, and otherwise accessed or utilized by the customer in the data plane is secure and unable to be accessed by other users in the data plane, who in some instances might even be provisioned on the same physical device(s). Approaches in accordance with various embodiments enable customers to provision a virtual private or isolated network, herein referred to as a "customer cloud." A customer cloud in many embodiments enables a customer (including individuals and enterprises) to connect to a set of isolated compute resources using a virtual private connection. The isolated resources in the customer cloud can communicate with other resources in the data plane, and can connect directly to customer devices outside the data plane. In some embodiments, a customer can specify the private IP address range to be used, as well as to divide that private IP address range into one or more sub-networks ("subnets") in order to conveniently manage applications and services executing in the customer cloud. The customer cloud can provide end-to-end network isolation by utilizing the specified IP address range and routing all network traffic between the customer cloud and an external customer network through secure connection, such as may be provided using an industry-standard encrypted IPsec private network. The customer then can leverage any preexisting security infrastructure, such as firewalls and intrusion detection systems, to inspect network traffic going to, and from, the customer cloud. Aspects of a customer cloud can be managed using Web services calls to one or more APIs of the control plane, as discussed above.

In order to provide certain functionality in a customer cloud, it can be necessary to provision or otherwise make available various network appliances or appliance services. For example, if the customer would like to implement load balancing across various resources in the customer cloud, then the customer in some embodiments might have to configure and/or enable a load balancing appliance to execute within the customer cloud. This appliance might be provided by an entity managing the data plane resources or by a third party, such as an appliance vendor, for example. Running an appliance, instance, or other such component or service within a customer cloud will require some use of the resources inside that customer cloud. This can be problematic for at least some customers for a number of different reasons.

For example, an instance of an appliance might need to communicate with at least one other instance of that appliance in the dedicated customer space for various reasons that should not be billed to the customer. Further, an appliance offered by a third party vendor might need to be able to communicate with the vendor or other endpoint in order to operate properly, such as to enable troubleshooting, allow for billing information to be collected, etc. One of the main reasons many customers select to use dedicated virtual resources such as a customer cloud is that the customers desire an environment that is isolated from other external resources, and that enables the customers to control traffic within that environment, such that a customer can prevent arbitrary, unauthorized, and/or potentially interactions with resources in the customer space. In many instances a customer can explicitly allow arbitrary interactions between a component (e.g., an appliance) inside the customer cloud and an entity or address outside cloud. Customers might not be comfortable opening up multiple channels, ports, or other communication mechanisms with external entities, as opening up such channels increases the possibility that an unintended party can access or interfere with the customer cloud. At the very least, some customers may not appreciate having to make an explicit allowance for each such channel.

Further, customers typically are charged for usage, allocation, and other such aspects of the customer cloud. A customer may not appreciate paying for the amount of bandwidth or resources used by an appliance for purposes such as monitoring or gathering billing information. In many cases, a customer will pay a flat or monthly fee for an amount of resources, and it is understood that monitoring and other such aspects by the provider of the space will be included in that fee. Thus, it can be desirable to separate out such traffic and usage from that of the customer, in order to prevent the instance- or provider-related traffic from being billed or counted against an allotted capacity of the customer. In many cases, however, it is difficult to separate out the types of traffic for purposes such as billing and usage determinations.

Further, from the perspective of the vendor, it can be desirable in at least some situations to prevent the user from accessing, monitoring, or manipulating information communicated to the vendor. For example, if the vendor is collecting usage information to use for billing, then the vendor would like to be able to prevent the user from intercepting and potentially altering the information. Also, exposing certain update channels to the customer can potentially enable the customer to adjust the functionality or other aspects of the appliance, which might be undetectable to the vendor.

Thus, it can be desirable in at least some situations for an appliance or service to function within a customer cloud in a way that is substantially invisible to the customer. Further, it can be desirable to allow communications for such an appliance that do not expose the other portions of the customer cloud to external entities, and/or that are not billed or counted against the customer resource allocation.

Systems and methods in accordance with various embodiments can implement at least some of these and other such aspects, and can overcome various deficiencies in conventional approaches, by utilizing aspects of a control plane or similar control structure in combination with a separate dedicated address space, separate network portion, or sub-net of the dedicated space referred to herein as a "backnet." A backnet refers, generally, to a dedicated sub-network that communicates with a specific logical side of a device, such that an appliance can be thought of as communicating with customers through a "front" side of the device and communicating with a vendor, another instance of the appliance, a different appliance or resource in the dedicated customer space or other such endpoint through a logical "back" side of the device. It should be understood that the terms front and back are used for purposes of explanation only, and do not refer to specific sides of a device or any specific orientation but to different logical communication channels or mechanisms. As part of the agreement between the customer and an appliance service, for example, the customer can permit the appliance service to create subnets, routers, and other backnet components within the customer's dedicated cloud. In some embodiments, a customer can enable multiple vendors to share a backnet or set of dedicated ports, etc. Since the appliances and/or components are owned by the appliance service, for example, the appliance service can be billed for all usage of the backnet. The customer in many embodiments will be able to see that the backnet has been implemented within the customer cloud, but the customer will not be able to change the configuration or interrupt traffic for the backnet.

Figure 3A:
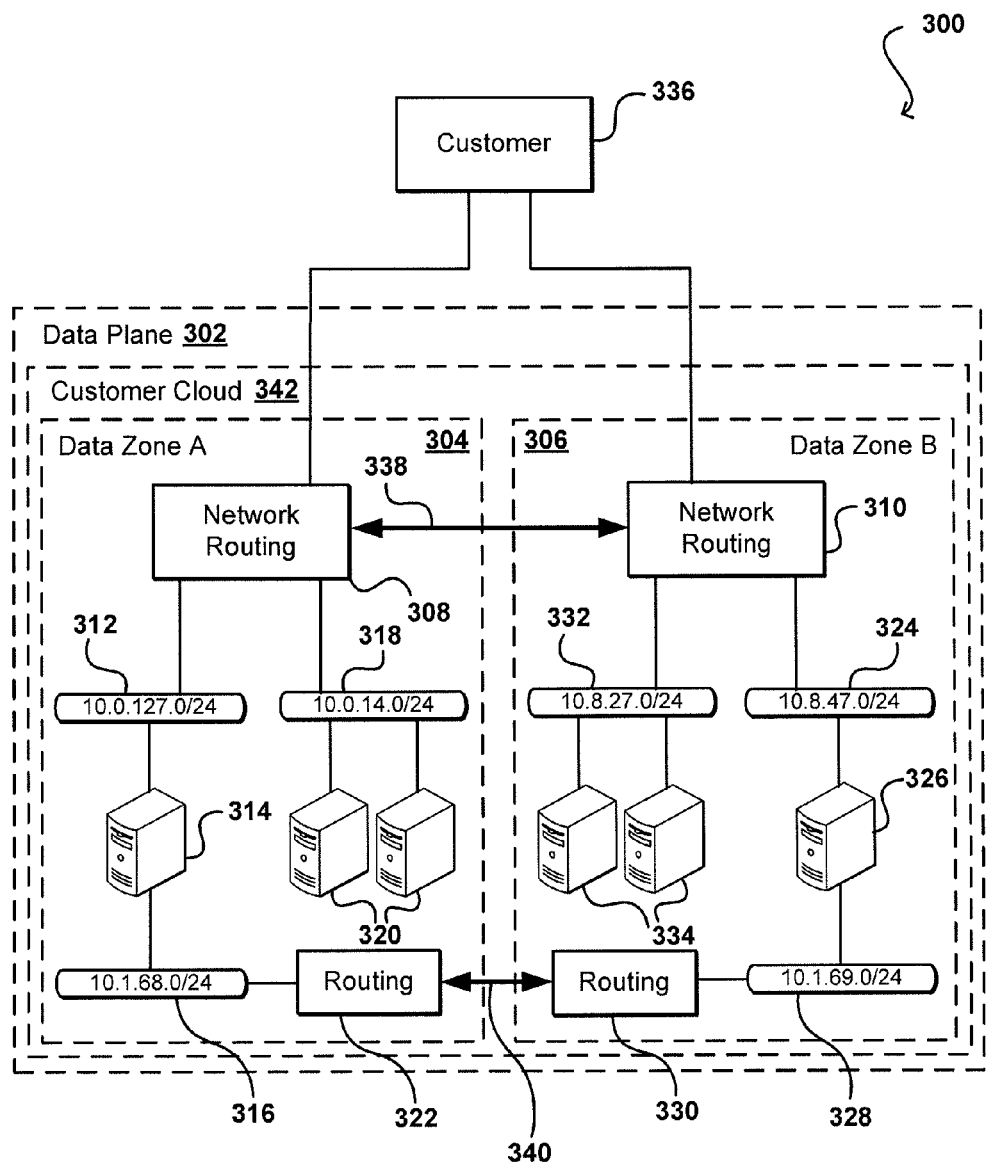
FIGS. 3(a) and 3(b) illustrates examples of a backnet implementation that can be used in accordance with various embodiments.

In the example of FIG. 3(a) (discussed in more detail below) there is a server 314 that hosts an instance of an appliance or other resource in a customer cloud, and that instance has a front side address 312 that enables communication exposed to, and under control of, the customer 336 and a back side address 316 that enables the server (or an appliance in the server) to communicate with an endpoint inside or outside of the customer cloud 304, but in a way that is not accessible by, or under the direct control of, the customer. The back side address 316 and any routing components 322 (along with other aspects not shown but apparent to one of ordinary skill in the art for use in such environments in light of the present description) can generally be thought of as comprising the backnet for the customer cloud 304 in this example. Although in the example of FIG. 3 the backnet is communicating with between a first data zone (data zone A) 304 and a second data zone (data zone B) 306 within the dedicated customer cloud 342 in the data plane 302, it should be understood that the backnet could be communicating with another appliance instance within the same data zone, or a third party or other endpoint outside the data plane and/or across a network, such as to communicate information such as replica information or control traffic across the Internet. It should be understood that different backnets can enable different traffic. For example, a backnet might only allow for communication between appliances or instances within the dedicated customer space. Some embodiments might also, or alternatively, enable communications outside the dedicated customer space, such as to a vendor or other third party. Various other configurations can exist as well as should be apparent in light of the present disclosure.

In addition to enabling an appliance to send and receive communications that are isolated from the customer, a backnet also can allow a vendor to be able to access and/or control aspects of the appliance. For example, a load balancer instance might periodically send metering data to a third party entity for billing purposes. In addition, the third party or a related entity can send updates or other such information to the appliance. An authorized external entity also can perform tasks such as to perform diagnostics or debugging, push profile or policy data, or any other such task requiring access to the appliance. Such functionality can occur at least partially within the isolated customer cloud, but the appliance can appear like a black box to the customer as the customer will never see these interactions (in at least some embodiments).

As discussed with respect to FIG. 2, components of a control plane 208 can be used to configure aspects of a customer instance and/or customer cloud, such as may be extended to include setting up backnets for specific appliances, customers, clouds, etc. In some examples, a customer (or vendor, etc.) can make a Web services call into the control plane to specifically request the creation of a backnet. In other embodiments, the backnet might be a requirement of the customer installing or utilizing an appliance or other component or module within a customer cloud, and the acceptance of the requirements can trigger the creation of a backnet without a separate authorization or communication from the customer. For example, a task to provision an appliance for the customer in the data plane can be stored to a job queue for execution by the components of the control plane. Upon execution of that task, a workflow can be generated in the control plane that includes, as a task to be performed in the data plane, the creation of a backnet allowing the appliance to communicate with a specific endpoint, which may be external to the data plane. As part of the workflow, the control plane may optionally communicate with the customer, vendor, or other such party to obtain information necessary for the installation or provisioning, such as an address or other service endpoint to use for the backnet communications.

FIG. 3(a) illustrates an example configuration 300 wherein there are two data zones (data zone A 304 and data zone B 306) within a dedicated customer cloud 342. The data zones in this example comprise resources in different geographical areas, where resources of the customer cloud 342 can be distributed across those geographical areas. In this example the data zones include portions of the same customer cloud 342 for the same customer 336, although it should be understood that these could alternatively be portions of clouds for different customers, different instances of the same customer cloud in different geographical regions, or any of a number of other possible configurations as discussed and suggested elsewhere herein. Further, although both endpoints in this example are within the data plane, it should be understood that a backnet can communicate with other entities or addresses outside the data plane, such as with a third party system located at a remote location and contacted via the Internet, using the same or a different address or interface, as will be discussed with respect to the example of FIG. 3(b).

In this example, a network provider (not shown) might offer the customer 336 the use of shared resources, which can include a number of data or application servers 320 and a management server 314, for example. The network provider might also offer, as part of the resource package, a redundant set of resources located in a different geographic location for purposes of fault tolerance and disaster recovery, or other such reasons. The redundant cloud resources will need to be able to communicate between zones for purposes such as synchronization and data recovery. Since the redundancy is part of the package, the customer might not want to be charged separately (either monetarily or against an allocation) for the traffic due to providing the redundancy. Accordingly, the network provider might want to utilize a backnet to enable the redundancy communications in a way that can be isolated from customer traffic, and under control of the network provider or a third party vendor, while still residing in the customer cloud(s).

In this example, each data zone has a set of network routing and interconnection 308, 310, including any appropriate components known or subsequently developed for such purposes. Each data zone also includes an address and port 312, 332 of a virtual interface for the management server 314, 326 and a separate address and port combination 318, 324 for the application or data servers 320, 334 (e.g., the primary and backup replicas). While management and application servers are used herein for purposes of explanation, it should be understood that the data zones can each include any appropriate selection and combination of appliances, devices, systems, components, software, hardware, modules, and other such elements as would be used for such purposes. Further, the data zones do not necessarily have to have the same number, type, or selection of components.

In this example, the customer-facing virtual interfaces 312, 318, 332, 324 between the servers and the customer (from a data path standpoint) are part of the "frontnet," or the portion of the cloud that is exposed to, and controlled by, the customer 336. For example, the customer can send a Web services request to an appropriate API of the control plane (see FIG. 2) to adjust aspects of the frontnet, including performance of at least a portion of the servers and other components of the cloud. The customer can also potentially monitor, or at least have access to, any traffic over the frontnet. Components in the frontnet of data zone A are also able to communicate with components in the frontnet of data zone B, but these communications will be accessible, and billed, to the customer.

In order to allow the management servers 314, 326 of the different data zones 304, 306 to communicate outside the frontnet, each management server implements a second virtual interface 316, 328, which is isolated from the customer 336. This address and port out the logical "back side" of the server, along with appropriate routing and interconnection components 322, 330 (which may be isolated portions of the main cloud routing components 308, 310), form the backnet, or the portion of the customer cloud that is isolated from the customer and enables an appropriate appliance (e.g., a management server or device or module thereon) to communicate with another appliance, component, instance, entity, or address within the customer cloud, such as a redundant appliance in another data zone. In this example, the management servers 314, 326 can communicate with each other over the backnet of each data zone 304, 306, in a way that is isolated from the customer, and can be billed or monitored separate from customer usage. Further, the same or an additional backnet can be used to allow either or both of the management servers to communicate with the network provider or a third party, in order to allow that external entity to control, monitor, update, troubleshoot, or otherwise access the management servers and/or other various components within the customer cloud. Further, because the traffic 338 over the frontnet is separated from the traffic 340 over the backnet, aspects such as usage and billing can readily be determined without a complicated separation process.

Figure 3B:
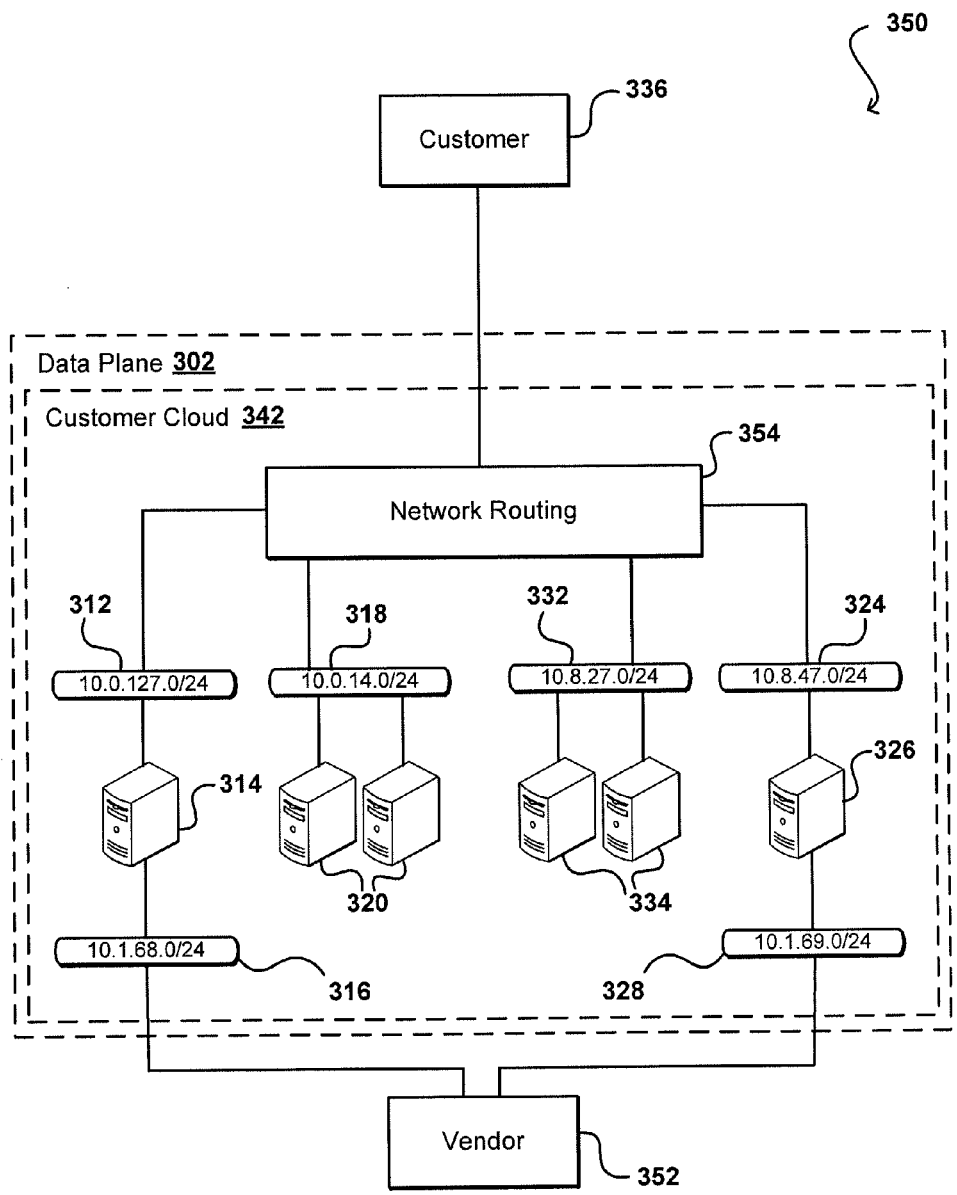

FIG. 3(b) illustrates an example configuration 350 wherein the dedicated customer cloud 342 and network routing components 354 are not separated into, or provisioned across, multiple data zones. Further, in this example the vendor appliances 314, 326 are able to communicate outside of the customer cloud 342, in this case with the vendor 352 operating those instances. In this example, the backnet can enable the appliances to communicate with one or more entities or addresses outside the data plane, such as with a third party system located at a remote location and contacted via the Internet, using the same or a different address or interface as was described with respect to FIG. 3(a), which enabled the appliances to communicate with each other within the customer instance. In some embodiments, the vendor 352 can communicate with the appliances and utilize communications within the backnet at any time and for any appropriate reason. In other instances, the vendor might only be able to access the backnet at certain times and/or limited to certain functionality. If multiple vendors share the backnet, the access by each vendor might be controlled such that only one vendor has access at a time, and only access to appliances operated by, or working with, that vendor or third party. Various other configurations can exist as well as should be apparent in light of the present disclosure.

In at least several embodiments, the existence of the backnet components, functionality, and traffic will be invisible to the customer as discussed above, with the customer typically only being aware of the existence of the backnet and potentially authorized types of use or specific users of that backnet. In some cases, the backnet will be generated automatically when the customer selects to deploy or utilize a certain appliance or type of resource. The customer's incurred charges also can be unaffected by the usage of the backnet. Since the customer in at least some embodiments is paying for dedicated and isolated space, the customer can have the option of turning off, disabling, or removing permission for the backnet, which can result in the appliances no longer working or being available to the customer in that customer cloud instance.

While the customer can ultimately have control over whether or not a portion of the customer cloud is used for a backnet, in at least some embodiments, moving traffic to a backnet that is otherwise isolated from customer access and control can prevent the customer from utilizing filters or other mechanisms that might restrict certain types of traffic that might prevent the appliances from functioning properly. Further, the isolation can prevent a customer from accidentally, or purposefully, modifying the traffic between appliance instances or an appliance and a vendor, for example, which can affect the ability of the appliance to function and/or the ability of the vendor to perform tasks such as usage monitoring and debugging. In some cases, the customer could accidentally prevent the appliance from working by restricting a type of communication necessary for the appliance.

The backnet addresses 316, 328 provide a constrained way of effectively tunneling within or through the private customer cloud. Using such addresses and tunneling, vendors can be allowed to implement and communicate with virtual appliances in the virtual customer network. In the example of an appliance such as a load balancer, a customer instance might be provisioned that is to be metered by, and associated with, the load balancer vendor, but that will run in the customer cloud. The customer can, either directly or indirectly, delegate the rights or authority to implement or enable functionality in the customer cloud to communicate with the outside vendor. The delegated rights might be required by an IAAA (identity authentication and authorization auditing) system utilized for the cloud. The customer in some embodiments must first authenticate the customer identity to the system before delegating the ability, without which the vendor cannot launch new load balancers in the customer cloud.

Figure 4:
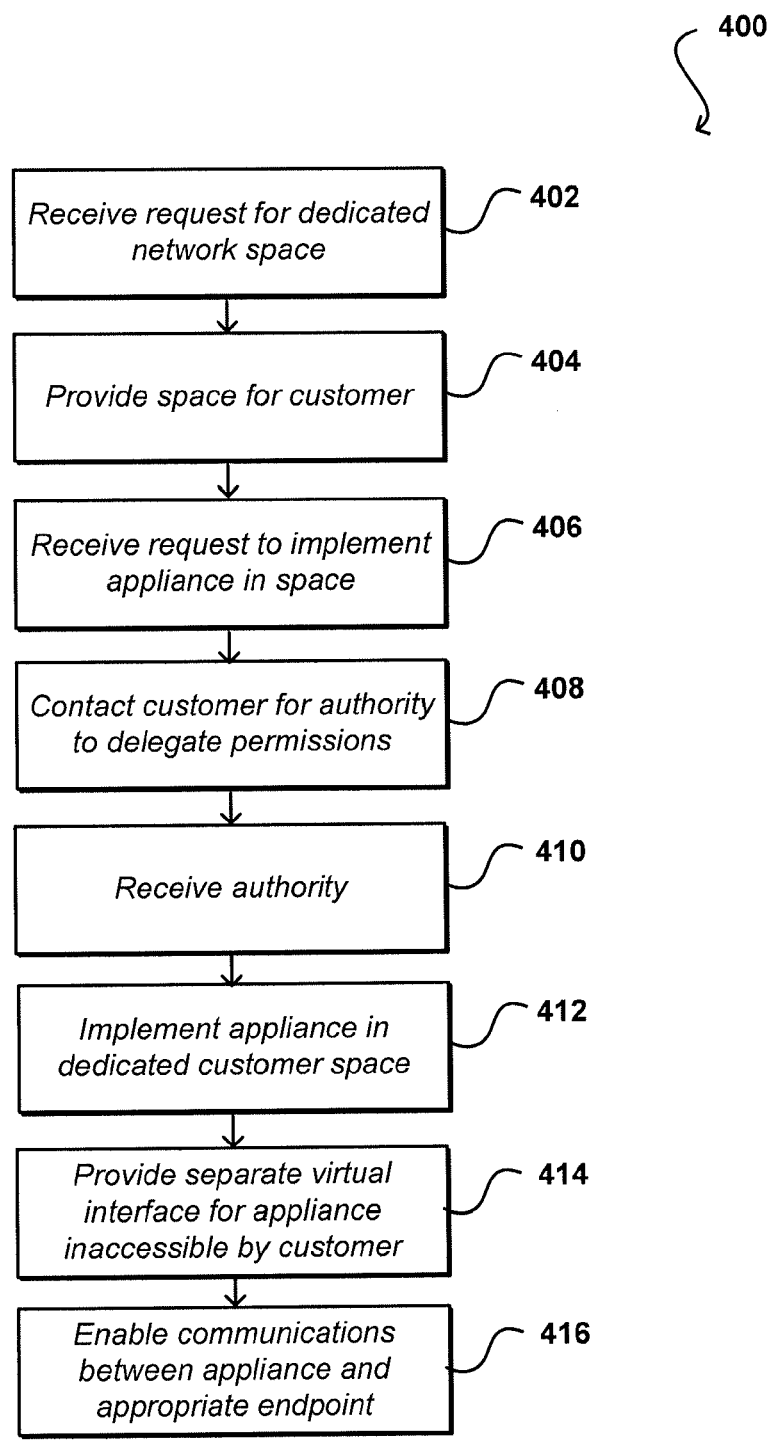
FIG. 4 illustrates an example process for implementing an appliance service that can be utilized in accordance with one embodiment.

FIG. 4 illustrates an example process 400 for providing dedicated access for an appliance service from a dedicated virtual private customer network that can be used in accordance with various embodiments. In this example, a request is received from a customer for a dedicated network space, or customer cloud 402. As discussed, this can comprise a Web services call received to an API of a control plane or other appropriate request. In response, the network provider can provision and make the customer cloud available to the customer 404. Subsequently, or as part of the same request, a request is received from the customer (or an appliance vendor or other third party) to implement an appliance in the customer cloud 406. While this example includes an appliance, it should be understood that any other appropriate component or service discussed herein for such purposes could be used as well in other examples. In response to the request, the customer can be contacted for authority to delegate certain permission(s) on the customer cloud to the appliance and/or appliance vendor 408. In one example, the permission can include the delegation of authority to communicate through an isolated interface over a range of addresses. Once the delegation authority is received 410, the appliance can be implemented within the customer cloud 412 and at least one virtual interface dedicated for use by the vendor can be made available 414. In many embodiments, this virtual interface will not be accessible or even visible to the customer. The vendor appliance in the customer cloud then can be able to communicate with an appropriate or specified endpoint, such as another appliance, appliance instance, or vendor system internal or external to the customer cloud using the dedicated interface 416.

In some instances, it is desirable for the vendor to be able to launch new load balancers as the cloud (or at least resources therein) can have the ability to elastically expand, and it can be undesirable for the customer to have to explicitly authorize each load balancer to be launched to handle the expansion. In some embodiments, the customer can enable the vendor to launch instances during a single authorization through the control plane, which then can enable the vendor to dynamically and automatically expand without having the user to again authenticate and allow the vendor action. The ability for a customer to provide the vendor with ongoing the ability to startup new instances, appliances, applications, etc., is referred to herein as "run-in delegation." Run-in delegation can be handled via Web services and APIs of the control plane, for example, with delegation information being stored to an Admin data store or similar location as discussed above with respect to FIG. 2.

Run-in delegation can be used for other purposes as well. For example, an auto-scaling appliance can be implemented in a customer cloud that automatically scales up the number of customer servers that are running in the cloud instance. If the customer is running a website in the customer cloud, and the customer is using the auto-scaling appliance, the appliance can monitor the amount of traffic on the customer's servers in the cloud, and if the traffic reaches a certain level or threshold then the auto-scaling appliance can automatically setup another customer server instance. In order to accomplish this, however, the auto-scaling control instance needs to be able to execute tasks as the customer in the customer cloud environment. In this example, the auto-scaling vendor might not know anything about the additional customer server instance being provisioned, as that instance is part of the frontnet and is isolated from the vendor. The vendor just needs to be able to request that an additional instance starts up, or shuts down, in order to scale to current customer needs, preferences, etc. Thus, for a capacity-based system or system based on access controls, the system can delegate certain abilities from a customer identity to an identity representing a vendor, third party, or other authorized entity. The run-in delegation can enable a vendor to implement a private vendor sub-network that is contained within the customer cloud but isolated from, and invisible to, the customer. The vendor then can have dedicated access to, and control over, appliances and other components of the vendor sub-network, and the usage of the sub-network can be metered and billed separately from the usage of rest of the customer cloud (which is typically billed to the customer). In some embodiments the customer is able to place restrictions on the size or ability of these vendor sub-networks, in order to ensure available capacity for customer usage, while in other embodiments the vendor sub-net is not counted against the customer cloud.

Figure 5:
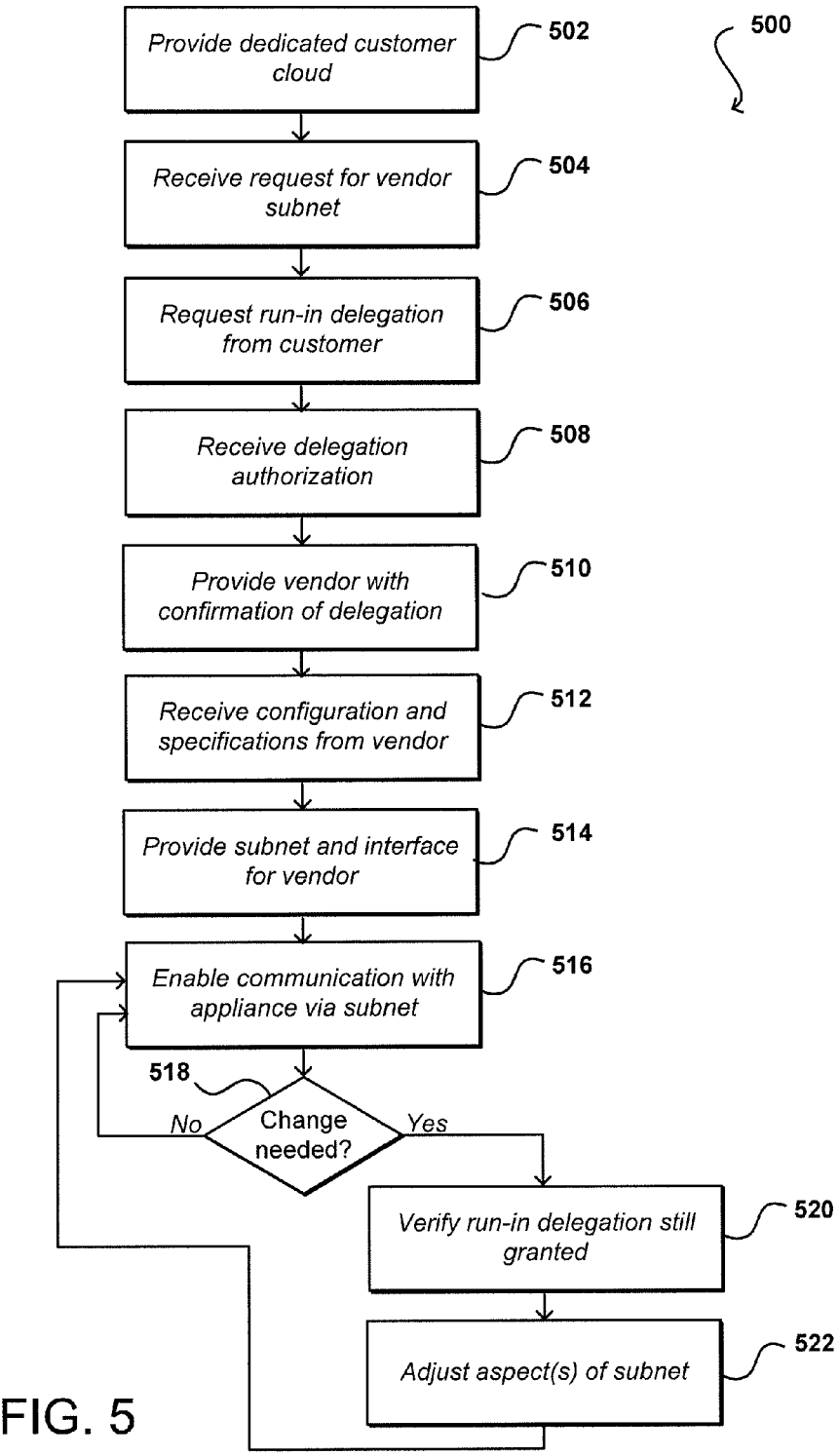
FIG. 5 illustrates an example process for creating a backnet in accordance with one embodiment.

FIG. 5 illustrates an example of a process 500 for setting up a private vendor subnet within a customer cloud that can be used in accordance with various embodiments. In this example, the network provider can provide a dedicated customer cloud for the customer 502. Subsequently, the network provider can receive a request for a subnet within the customer cloud 504. This request can come from the vendor or the customer, for example, in response to a user deciding to utilize an appliance or appliance service in the customer cloud. In response, the network provider (i.e., automatically via the control plane) can request run-in delegation or other such authorization from the customer for the subnet space 506, which can include authority to perform subsequent tasks such as scaling and provisioning new instances. Upon receiving the authorization from the customer 508, the vendor can be provided with confirmation of the authority and the ability to setup or configure the subnet 510. Communications can be received from the appliance vendor regarding the size and configuration of the subnet 512, and the subnet can be provided by the network provider within the customer cloud 514. For example, the vendor can specify an amount of address space needed for an appliance to function, or any other specification needed for the vendor sub-network components. The vendor also can configure the components of the sub-network as needed, within the rules and policies of the network. The vendor then can be enabled to communicate with the appliance, service, or other portions of the subnet using the dedicated virtual interface(s) 516. Any traffic to, or from, the vendor sub-net is between the appliance and the vendor, and cannot be accessed, modified, or even detected by the customer in most embodiments. In some cases, the customer can dedicate an address range within the customer cloud to the vendor, enabling the vendor to create sub-nets, routers, and other such components and attach those components per the vendor's specification to instances of the vendor appliance(s).

In cases where the vendor has run-in delegation, for example, the vendor (or a component of the subnet or control plane) can monitor the performance of the appliance(s) and determine when a change is needed 518. This can involve, for example, provisioning a new instance in the subnet, upgrading an appliance, troubleshooting a service, and any other appropriate function. When a change is needed, the control plane can verify run-in delegation 520 and automatically, or manually in response to control commands from the vendor or another appropriate entity, adjust the component of the subnet 522. After the adjustment, the subnet and customer cloud can continue to function as intended, with the backnet being a subnet of the dedicated customer cloud owned by a distinct party and with a delegation of permissions to allow the distinct party to interact with the backnet.

In some embodiments, the traffic for the vendor sub-net can be metered by metering traffic on the interfaces within the vendor sub-net and/or between the vendor sub-net and the external network. In such an embodiment, the appliance would have more than one interface to the network. At least one interface is exposed to the customer and enables communication with the customer via the frontnet, and another interface is exposed to the vendor and enables communication with the vendor via the vendor sub-net or backnet. In some embodiments, these interfaces can be provided using a pair of virtual network interface cards (NICs).

An interesting aspect about many embodiments described herein is that an isolated and/or dedicated set of resources can be made to be multi-tenant in nature. A customer can dedicate a portion of the customer network to another party, and the customer cannot view or have access into that portion of the customer network that is now dedicated to the other party. The customer essentially passes the rights to at least a portion of a dedicated resource to another party, without the ability to make changes, monitor usage, etc. The customer also does not get billed for that usage of the dedicated customer resources. The vendor pays for its portion of the dedicated resources, and also is not able to access or make changes to the isolated customer portion of the network.

In some embodiments, a multi-component backnet is not needed, as long as there is a separate interface that can be accessed by a vendor or third party outside the isolated customer network. In other embodiments, packets can be tagged in order to meter the usage even though the traffic is essentially running through the customer network. Certain security mechanisms can be implemented to attempt to prevent a customer from sending unintended types of traffic to a vendor instance, for example.

Other approaches can be used as well to effectively "tunnel" through the wall that is represented by a customer cloud or other such isolated and dedicated set of customer resources and/or instances. One approach is to require a customer to open a port through a virtual firewall of the cloud in order to enable a certain type of traffic (e.g., TCP/IP) that enables the vendor or third party endpoint to communicate with a particular appliance inside the customer cloud. As mentioned above, this vendor traffic functions as control plane traffic, which can call into components of the data plane for purposes such as monitoring and control. A potential downside to such an approach, as mentioned above, is that the open port potentially exposes the cloud to unwanted external traffic, and forces the customer in many situations to manage the rules for opening up Internet access, which the customer might not wish to manage.

Another approach is to utilize a more constrained approach for point-to-point communications. In such an approach, a customer can allow for communications between explicitly defined endpoints. This acts as a secret tunnel to a specific endpoint, although there is still a possibility for an external entity to gain unauthorized access to the customer cloud in some situations.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle® Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing an isolated subnet within a dedicated network space, comprising:
    under control of one or more computer systems configured with executable instructions,
        providing a dedicated network space for a customer, the dedicated network space including one or more dedicated resource instances in a distributed computing environment accessible and configurable only under permission of the customer;
        receiving a request to implement an appliance within the dedicated network space, the appliance requiring communication access to at least one endpoint within the dedicated network space, communication between the appliance and each endpoint within the dedicated network space to be separated from customer traffic within the dedicated network;
        obtaining run-in delegation from the customer for the communication access with respect to the appliance, the run-in delegation including providing a requesting entity an ability to startup the appliance; and
        enabling creation of an isolated subnet within the dedicated network space enabling communication between the appliance and the at least one endpoint, wherein the customer is prevented from interacting with network traffic within the isolated subnet, and wherein the appliance is prevented from interacting with the network traffic within the dedicated network space outside the isolated subnet.

2. The computer-implemented method of claim 1, wherein the customer is charged for usage of the dedicated network space outside the isolated subnet, the third party being billed for usage of the isolated subnet.

3. The computer-implemented method of claim 1, wherein the customer is able to limit the scope of the subnet or terminate the subnet at any time.

4. The computer-implemented method of claim 1, wherein the appliance is in a first data zone and at least one endpoint in the dedicated network space is in a second data zone.

5. The computer-implemented method of claim 1, wherein the appliance has at least one port for communication with the customer and at least one port for communication with the at least one endpoint.

6. The computer-implemented method of claim 1, wherein the customer is able to limit at least one of a type, a time, or a frequency of communication for the communication access.

7. The computer-implemented method of claim 1, wherein the isolated subnet further enables the appliance to communicate with at least one endpoint external to the dedicated network space.

8. The computer-implemented method of claim 1, wherein a vendor associated with the appliance is able to configure and control communications and configuration in the isolated subnet.

9. The computer-implemented method of claim 1, wherein multiple third parties are able to share the isolated subnet.

10. The computer-implemented method of claim 9, wherein the customer is able to delegate a first address space to one third party and a second address space to another third party in the dedicated network space.

11. The computer-implemented method of claim 9, wherein the multiple third parties are isolated from each other within the isolated subnet.

12. The computer implemented method of claim 1, wherein the run-in delegation includes providing the requesting entity the ability to startup at least one of a new resource instance, a new appliance, or a new application.

13. The computer implemented method of claim 1, wherein the appliance is one of a network appliance, network service, or a network application.

14. A computer-implemented method of providing external access to an appliance in a dedicated network space, comprising:
under control of one or more computer systems configured with executable instructions,
providing a dedicated virtual network space in a distributed computing environment to a customer, the customer able to configure aspects of the dedicated virtual network space and control access to the dedicated virtual network space;
receiving a request to utilize an appliance in the dedicated virtual network space, the appliance requiring access to an external endpoint outside the dedicated virtual network space and operated by an entity other than the customer, communication between the appliance and each endpoint within the dedicated virtual network space being separate from customer traffic within the dedicated virtual network space;
obtaining permission from the customer to provide external access to the appliance, the permission including providing to a requesting entity an ability to startup the appliance; and
generating an isolated virtual interface within the dedicated virtual network space, enabling the appliance to communicate with the external endpoint, the customer being prevented from accessing communications over the isolated virtual interface, the appliance being prevented from interacting with the network traffic within the dedicated virtual network space outside the isolated virtual interface.

15. The computer-implemented method of claim 14, further comprising:
generating an exposed virtual interface enabling the customer to communicate with the appliance in the dedicated virtual network space, the entity operating the external endpoint unable to access communications over the exposed virtual interface.

16. The computer-implemented method of claim 14, wherein the permission is contained implicitly or explicitly in the request to utilize the appliance in the dedicated virtual network space.

17. The computer-implemented method of claim 14, wherein the permission further enables the entity operating the external endpoint to control, independent of the customer, a subnet of the dedicated virtual network space associated with the isolated virtual interface.

18. The computer-implemented method of claim 14, wherein the permission further enables the entity operating the external endpoint to generate instances and enable communications within the subnet.

19. The computer-implemented method of claim 14, wherein the entity operating the external endpoint is charged for usage of the subnet instead of the customer.

20. The computer-implemented method of claim 14, wherein each of the dedicated network space and the subnet is dynamically reconfigurable using one or more Web services calls to one or more application programming interfaces (APIs) of a control plane associated with the dedicated virtual network space.

21. The computer-implemented method of claim 14, wherein the appliance is one of a load balancer, a data store replication manager, an auto-scaling appliance, a firewall, a network accelerator, a container manager, a configuration detector, and a caching appliance.

22. A system for providing isolated functionality in a dedicated network space, comprising:
a processor; and
a memory device including instructions that, when executed by the processor, cause the system to:
provide a dedicated network space in a distributed computing environment for a customer, the customer able to configure aspects of the dedicated network space and control access to the dedicated network space;
receive a request to utilize an appliance in the dedicated network space, the appliance requiring communication access to at least one endpoint within the dedicated network space, communication between the appliance and each endpoint within the dedicated network space to be separated from customer traffic within the dedicated network;
obtain permission from the customer for the communication access with respect to the appliance, the permission including providing to a requesting entity an ability to startup the appliance; and
generate an isolated virtual interface within the dedicated network space, enabling the appliance to communicate with the at least one endpoint, the customer being prevented from accessing communications over the isolated virtual interface, the appliance being prevented from interacting with the network traffic within the dedicated network space outside the isolated virtual interface.

23. The system of claim 22, wherein the instructions when executed further cause the system to:
  generate an exposed virtual interface enabling the customer to communicate with the appliance in the dedicated network space, the appliance unable to access communications over the exposed virtual interface.

24. The system of claim 22, wherein the instructions when executed further cause the system to:
  enable an entity associated with the appliance to control, independent of the customer, a subnet of the dedicated virtual network space associated with the isolated virtual interface.

25. The system of claim 24, wherein the entity operating the external endpoint is charged for usage of the subnet instead of the customer.

26. The system of claim 22, wherein the instructions when executed further cause the system to:
  enable the appliance to communicate with at least one endpoint outside the dedicated network space.

27. A non-transitory computer readable storage medium storing instructions for providing isolated communications in a dedicated network space, the instructions when executed by a processor causing the processor to:
  provide a dedicated network space in a distributed computing environment for a customer, the customer able to configure aspects of the dedicated network space and control access to the dedicated network space;
  receive a request to utilize an appliance in the dedicated network space, the appliance requiring communication access to at least one endpoint within the dedicated network space, communication between the appliance and each endpoint within the dedicated network space to be separated from customer traffic within the dedicated network;
  obtain permission from the customer for the communication access with respect to the appliance, the permission including providing to a requesting entity an ability to startup the appliance; and
  generate an isolated virtual interface within the dedicated network space enabling the appliance to communicate with the at least one endpoint, the customer being prevented from accessing communications over the isolated virtual interface, the appliance being prevented from interacting with the network traffic within the dedicated network space outside the isolated virtual interface.

28. The non-transitory computer readable storage medium of claim 27, wherein the instructions when executed further cause the system to:
  generate an exposed virtual interface enabling the customer to communicate with the appliance in the dedicated virtual network space, the appliance unable to access communications over the exposed virtual interface.

29. The non-transitory computer readable storage medium of claim 27, wherein the instructions when executed further cause the system to:
  enable an entity associated with the appliance to control, independent of the customer, a subnet of the dedicated virtual network space associated with the isolated virtual interface.

30. The non-transitory computer readable storage medium of claim 27, wherein the entity operating the external endpoint is charged for usage of the subnet instead of the customer.

* * * * *